Oct. 18, 1949.  W. W. PAGET  2,484,848
PRESSURE CONTROLLING APPARATUS
Filed Dec. 14, 1942  5 Sheets-Sheet 1

Inventor:
Win W. Paget
by
Louis A. Maxson
Atty.

Oct. 18, 1949.  W. W. PAGET  2,484,848
PRESSURE CONTROLLING APPARATUS
Filed Dec. 14, 1942  5 Sheets-Sheet 2

Inventor:
Win W. Paget.
by
Louis A. Maxon.
Att'y.

Oct. 18, 1949. W. W. PAGET 2,484,848
PRESSURE CONTROLLING APPARATUS
Filed Dec. 14, 1942 5 Sheets-Sheet 3

Inventor:
Win W. Paget.
by
Anis A. Winson.
Atty.

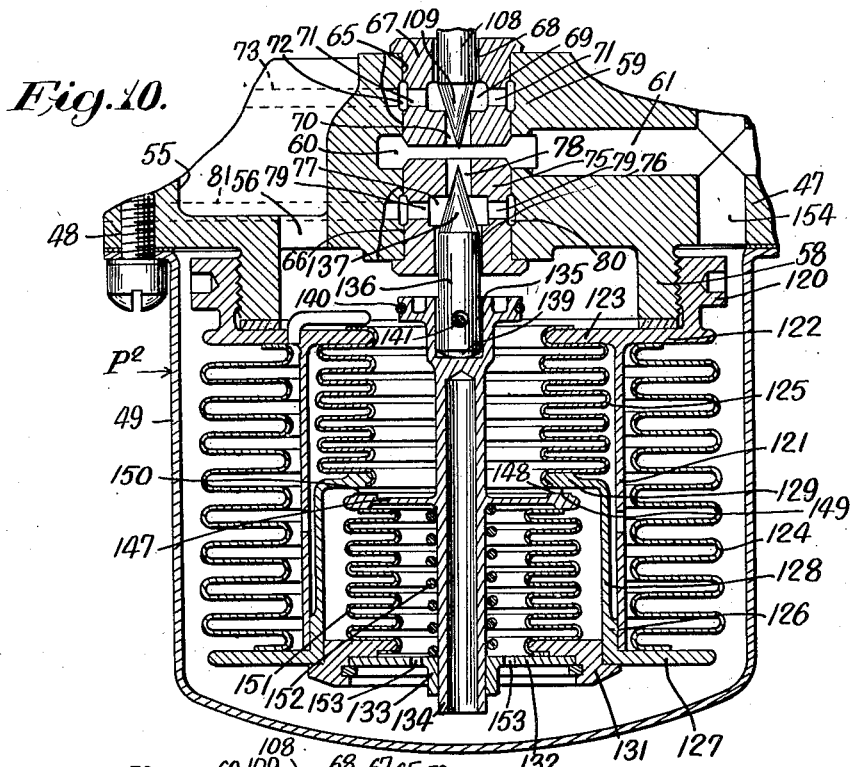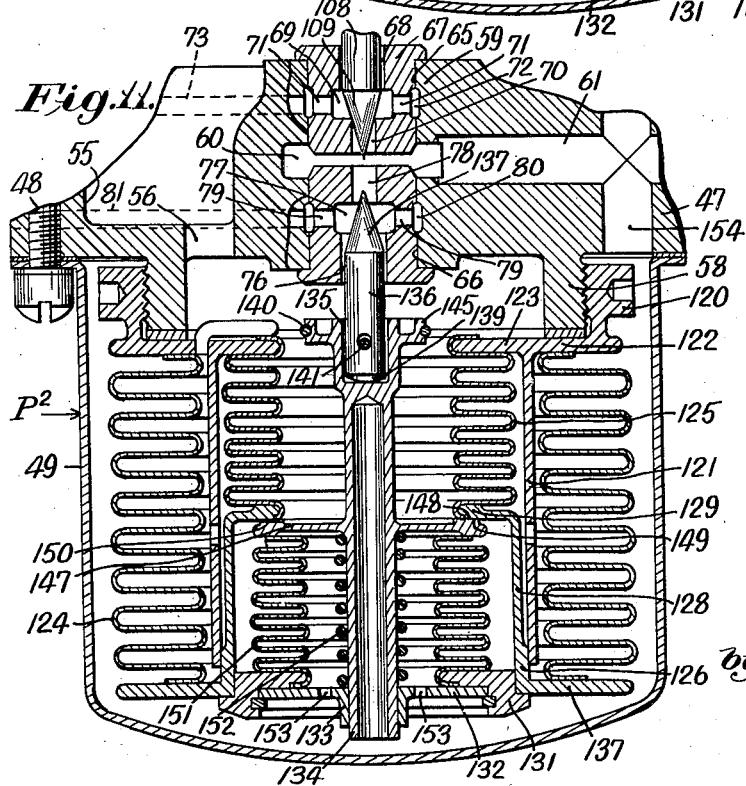

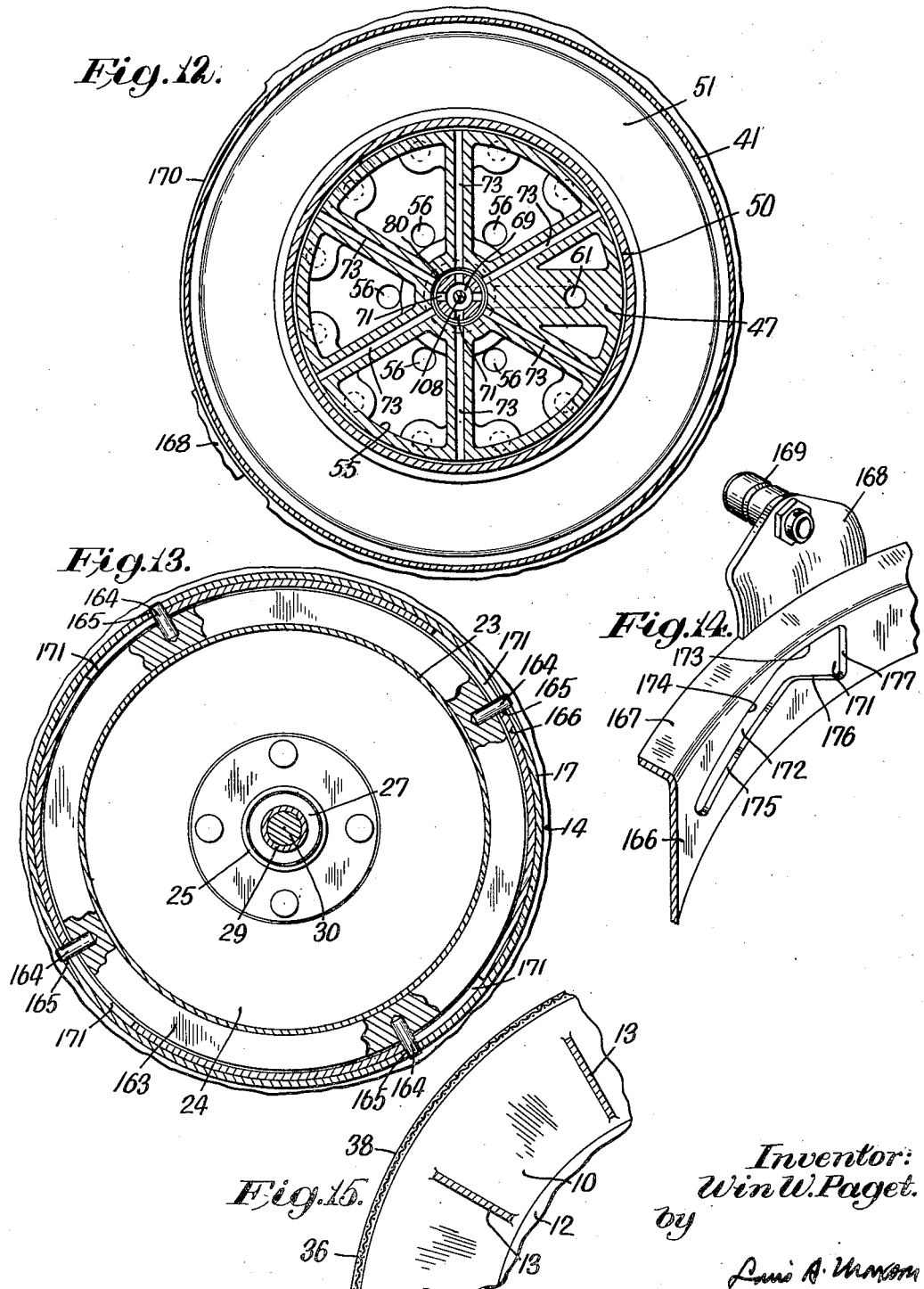

Patented Oct. 18, 1949

2,484,848

UNITED STATES PATENT OFFICE 2,484,848

PRESSURE CONTROLLING APPARATUS

Win W. Paget, Michigan City, Ind., assignor to Joy Manufacturing Company, a corporation of Pennsylvania Application December 14, 1942, Serial No. 468,938

44 Claims. (Cl. 98—1.5)

My invention relates to pressure controlling apparatus, and more particularly to apparatus for controlling the pressure in the cabins of airplanes. At high altitudes, flight is practically possible only by the use of enclosed cabins in which the pressure is artificially maintained substantially above that which subsists outside the cabin. In order that the cabin pressure can be so maintained, it is common to provide devices for pumping air from outside the cabin into the cabin, and, as a regulation of the pumping apparatus close enough to maintain desired pressure conditions is impossible, automatically controlled outflow valves are utilized.

Up to certain heights, such as, for example, eight to ten thousand feet, it is possible to permit the pressure in the cabin to drop substantially in the same way that external pressure falls off. After the cabin pressure has fallen to a value corresponding to the external pressure at this selected relatively low height, it is desirable that, until a considerably greater height is reached, say 30,000 feet, the pressure in the cabin may be maintained relatively constant at approximately the pressure which corresponds to 8,000 feet, 10,000 feet or whatever value is selected. If the plane has occasion to go above the upper limit mentioned, it is desirable that there shall be a variation in the cabin pressure with the changes in altitude, so that the cabin pressure may again be reduced as the external pressure becomes lower. In the zone between 30,000 and 40,000 feet, say, it is desirable that the cabin pressure be reduced, as elevation increases, in such a manner that there shall be maintained a constant pressure differential between cabin pressure and outside pressure. If the plane is to operate above 40,000 feet, for example, it is desirable that the nature of the control be changed so that there will thereafter be maintained a constant ratio between cabin pressure and outside pressure from 40,000 feet on up. It will be understood that these values are illustrative and may be varied in number. This type of control is important because of the power requirements and compression ratio limitations of centrifugal type cabin superchargers, and may be used without disadvantage with positive displacement types of pressurizing pumps as well. It is important that the reductions in pressure—and corresponding increases in pressure during descent of the plane—shall take place automatically because thereby the danger of damage to the cabin through excessive pressure differentials between the inside and outside thereof is reduced—this in addition to the fact previously pointed out that the load on the pressurizing device which has to elevate the pressure of the very rarified atmosphere to cabin pressure and which must work very hard at extreme heights unless the cabin pressure can be substantially reduced may be thereby relieved. It is furthermore important that devices of this character shall be simple in construction, positive in operation and compact, and that they shall have provision for the freeing of their parts from ice should any form upon them in use.

An object of the present invention is to provide an improved automatic pressure control device. Another object of the invention is to provide an improved automatic pressure control device having improved means for rendering it subject successively to different controls. It is a further object of the invention to provide an improved automatic pressure control device having a single operating mechanism actuated by the differential between the pressure inside and outside of a cabin and having improved control devices governing the pressure within the cabin under certain external conditions. A further object of the invention is to provide an improved automatic pressure control device having an improved arrangement of pressure responsive pilot devices. It is still another object of the invention to provide an improved automatic pressure control device especially adapted for the control of cabin pressure in airplanes. Yet a further object of this invention is to provide an improved automatic pressure control device having controlling means including a control element under the control of improved plural control mechanisms. Still a further object of the invention is to provide an improved automatic pressure control device automatically operative to maintain desired cabin pressures and having improved governing means whereby a pilot control mechanism may be successively caused to maintain a constant pressure differential between cabin and external pressures and a constant ratio between cabin and external pressures. A still further object of the invention is to provide an improved automatic pressure control device automatically operative to maintain uniformity of pressure conditions under certain external pressures and different sets of pressure conditions under other external pressures. Yet another object of the invention is to provide an improved automatic pressure control device automatically operative to maintain substantially uniform cabin pressure conditions during flight at certain altitudes, and cabin pressure conditions varying as altitude varies above a predetermined higher altitude, and having an improved means whereby the nature of the variation may be automatically altered with variations in the height of plane operation. Another object is to provide an improved automatic pressure control device operative to permit cabin pressures to vary substantially directly with external pressures up to a predetermined altitude; and then during certain further increases in altitude to maintain cabin pressure substantially constant; and, when a still higher altitude is reached, to provide for the maintenance of a cabin pressure between which and the external pressure there shall be automatically maintained a relatively constant pressure differential; and when a still higher altitude is reached, to provide for the maintenance of a cabin pressure which shall bear a relatively constant ratio to the external pressure. Still another object is to provide an improved pressure responsive valve device for controlling communication between the interior of a cabin and atmosphere, said valve device having improved means operative automatically to vary the communication between the cabin and the surrounding atmosphere and having improved pilot control mechanism. It is still another object of the invention to provide pilot mechanism having improved control bellows arrangements associated therewith. Other objects and advantages of the invention will appear from the following description and from the appended claims.

In the accompanying drawings, in which I have shown a preferred embodiment which my invention may assume in practice, Fig. 1 is a side elevational view of a preferred form of the pressure control device, the same being shown detached from its support;

Fig. 10 is a view similar to Fig 7 showing the pilot mechanism while the same is operating to maintain a constant pressure differential between the interior of the cabin and the exterior thereof;

Fig. 11 is a similar view showing the same pilot mechanism in the operation of maintaining a constant ratio between cabin pressure and external pressure;

Fig. 12 is a transverse section on the plane of the line 12—12 of Fig. 3;

Fig. 13 is a transverse section on the plane of the line 13—13 of Fig. 3;

Fig. 14 is a fragmentary perspective view of a portion of the de-icing and manual vent valve adjusting means, and Fig. 15 is a fragmentary sectional view on the plane of the line 15—15 of Fig. 3.

Figure 1:
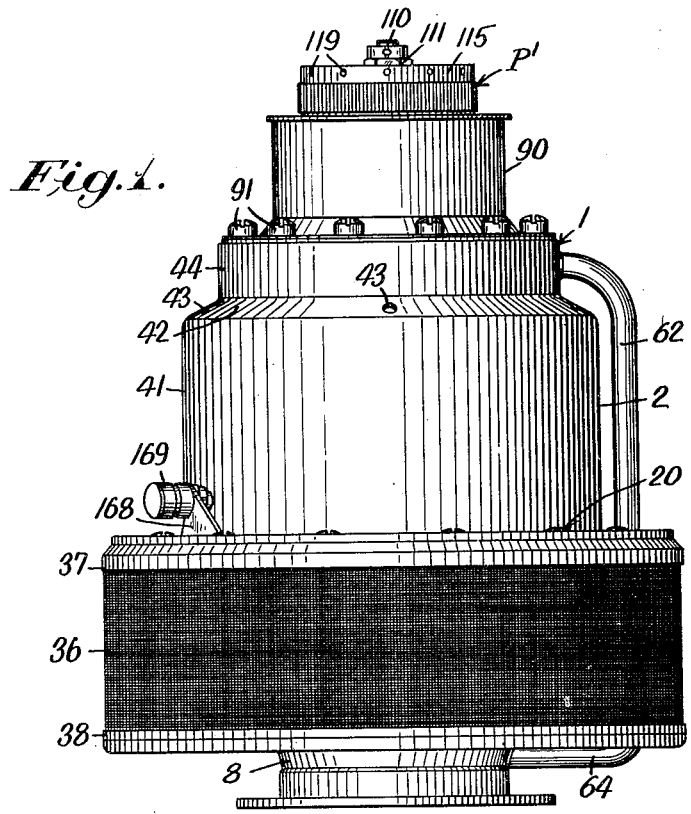
Figure 2:
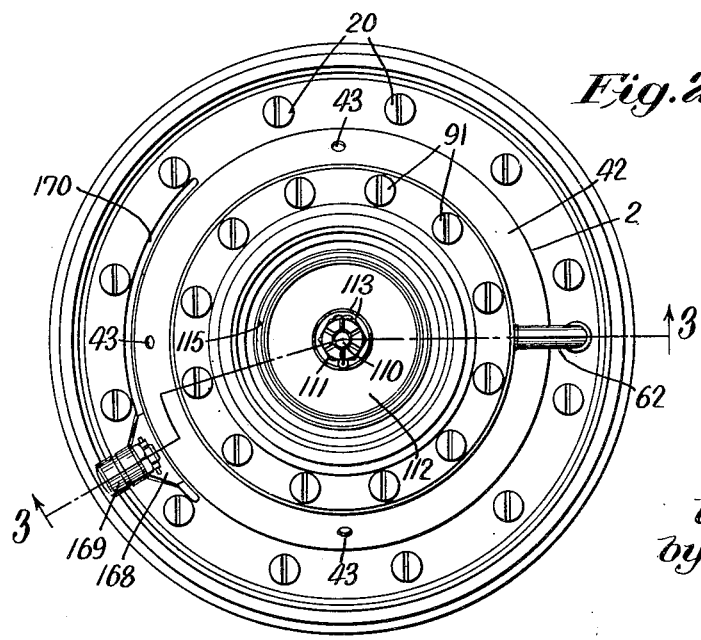
Fig. 2 is a plan view of the device shown in Fig. 1.

Referring now to the drawings, it will be observed that the device as a whole is designated 1 and that it comprises a casing 2, a vent valve 3, an expansible chamber control device 4, herein shows as a bellows, a primary pilot control device $P^1$ adapted to commence to function when the plane reaches an altitude above which a free drop in the cabin pressure may not desirably be continued, and a secondary pilot mechanism $P^2$ adapted initially to function, when a relatively high altitude is attained, to maintain a constant pressure differential between the cabin and external pressures, and upon a still further increase in altitude to function to maintain a constant ratio between the pressure within the cabin and the external pressure. The stationary casing 2 is adapted to be mounted over an opening in the wall of the cabin and to be disposed inside the cabin. The casing 2 includes a lower annular portion 7 which includes a tapering discharge-orifice-providing portion 8. The portion 8 is surrounded by an annular valve seat supporting surface 9 and an annular outer frusto-conical portion 10 which forms the lower boundary of a generally annular though partitioned passage 11 communicating with the interior of the cabin. At 12 there is arranged a suitable valve seat element of fibre or similar material, the same being mounted on the seat supporting surface 9. Connected by suitable webs 13 to the portion 10 is an upper annular wall 14 surrounding at its lower end a circular opening 15. A member 16 comprising an approximately cylindrical annular portion 17 and an approximately radial flange portion 18 is welded to the annular wall 14, the portion 17 thereof being connected to the wall 14 near the opening 15, and the flange portion 18 being welded to the annular wall 14 near the uppermost part of the latter. A seating surface 19 is provided by the radial flange portion 18. The member 16 further has threaded openings for receiving machine screw elements 20 for holding the parts in assembled position. Upon the seating surface 19 is supported a casing member 21 comprising a flange 22 resting on the surface 19, a cylindrical wall 23 coaxial with the discharge orifice provided by the portion 8, and finally a tapering downwardly projecting wall portion 24, connected to a guide supporting element 25 having a bore 26 in which upper and lower guide sleeves 27 and 28 are mounted, said sleeves serving to guide a tubular sleevelike stem 29 to which the valve 3 is attached. A suitable bolt 30 extends through the sleeve 29 and its head engages the lower end of the bellows device 4 to clamp said end against the sleeve 29; and the lower threaded end 31 of this bolt is engaged by a nut 32 which clamps in any suitable way a central portion of the valve 3 against an enlarged head 33 on the sleeve 29. The extreme upper end of the upper annular wall 14 is provided with an outwardly flared flange portion 35 which coacts with the wall portion 10 to bound the annular opening through which fluid enters the valve casing from the inside of the cabin. A suitable screen 36 is supported by circular elements 37 and 38 respectively at the outer edges of the flange portion 35 and the wall portion 10 to prevent the access of material which might damage the valve mechanism, to its interior.

Also supported by the seating surface 19, but resting on the flange 22, is an upper casing member 41 tapering inwardly, as at 42, at its upper end and perforated as at 43 so that the cabin pressure may attain freely the interior of the member 41. The upper end of the member 41 has an annular portion 44 of reduced diameter which carries at its top an inwardly directed annular portion 45 providing a seat for the primary control device P¹. The annular portion 44 closely surrounds a block member 47 to whose lower end there is fixed, as by holding screws 48, a downwardly projecting housing member 49. This housing member surrounds and encloses the operating structure for the pilot mechanism P². The lower surface of the block member 47 has a ring 50 secured to it, and brazed, or otherwise suitably fastened, to the ring 50 is a diaphragm or expansible chamber bellows 51 surrounding the housing member 49. The lower end of the bellows 51 is connected to a ring member 52 which has secured to it a generally conical element 53 forming the bottom element of the bellows device 4 and which is clamped by the bolt 30, previously described, to the sleeve 29.

The block 47 is cored-out as at 55, and has passages 56 extending from the cored-out portion 55 into a circular chamber 57 which lies to the inside of a depending threaded flange 58 carried by the block 47. The block 47 also has a central portion 59 within which a space 60 is formed, and this space is connected by passage means 61 in the block and by tube elements 62, 63, 64 to the discharge orifice formed by the member 8, whereby the space 60 is at all times connected to external pressure. Communicating with the space 60 are coaxial bores 65 and 66. The bore 65 receives what may be termed a bushing member 67, and the member 67 is traversed by a relatively large bore 68 opening into a chamber 69, and a smaller coaxial bore or passage 70 opens from the chamber 69 into the space 60. The chamber 69 is connected by radial passages 71 with an annular groove 72 which is connected by passages 73 with the interior of the bellows device 4. Another bushing member 75, generally similar to the member 67, fits within the bore 66 and is traversed upwardly from its lower end by a relatively large bore 76 leading into a central chamber 77, and the latter is connected by a smaller bore 78 with the space 60. Radial passages 79 open from the chamber 77 into an annular groove 80 which is connected by passages 81 with the interior of the bellows device 4, that is, the interior of the collapsible bellows 51.

Mounted on the flange 45 is a perforated radial flange 83 which supports a circumferential wall 84 whose top is provided with an integral closure cap portion 85. The wall 84 has longitudinal slots 86 which slidably receive pins 87 mounted in a flange 88 on a sleeve portion 89 which is vertically slidable within the wall portion 84. Another radially flanged member 90 seats upon the top of the flange portion 83, and the member 90 is clamped with the radial flanges 83 and 45 to the block 47 and the ring 50 by suitable holding screws 91. At its upper end the member 90 supports inside the same a flanged annulus 93 between which and an annular member 94, L-shaped in cross section, a suitable screen 96 is mounted with its lower end disposed just to the inside of opening 97 in the flange member 83. An annular opening 98, just inwardly of the flanged annulus 93, opens into the space to the inside of the screen 96; and the space within the interior of the cabin communicates through the opening 98 and the screen 96 with the space within the block 47 and through the passages 56 with the chamber 57. The cap member 85 supports, at its inner side, a head 100 and a stop stem 101. Surrounding the stop stem, and brazed, or otherwise suitably held, to the head 100 is an evacuated sealed bellows 102 whose lower end is attached to a plate 103 connected with an annular wall portion 104 providing a shoulder 105 against which a spring 106 engages at its lower end. The upper end of this spring engages the flange 88 previously mentioned. The plate 103 has a central socket-providing portion 107 in which there is secured a valve member 108 fitting loosely within the bore 68 and having a tapered end 109 adapted to close the opening 70. The manner of supporting the valve 108 will be more fully described in connection wtih a similar valve forming a part of pilot mechanism P². At the upper end of the stop member 101 is a threaded portion 110 extending upwardly through an opening in the cap portion 85, and threaded on the portion 110 is a nut 111 for holding the stop stem 101, the plate 100 and other parts, shortly to be described, in assembled relation with the cap portion 85. Nonrotatably mounted above the cap member 85 is an annular, peripherally flanged, element 112, and suitable spacing washers 113 are provided to maintain the plate 100, the cap 85 and the nonrotatable flanged element 112 in proper relation. The member 112 and the cap member 85 provide an annular space 114 between them in which there is rotatably supported an adjustable member 115 having a sleeve-like portion 116 extending through the annular space 98 and internally threaded as at 117, the threads of such member coacting with the ends of the pins 87. By rotating the member 115 the pins, which are held against rotation about the axis of the stop pin 101 by the slots 86, will be caused to move up or down in these slots and to move the flange 88 to relieve or to increase the compression of the spring 106. Openings 118 in the members 112 and 119 in the member 115 may be used to maintain the adjustments of the latter member, as through the threading of holding means through adjacent openings. Much of the subject matter heretofore described, but with certain differences in shape and in proportion, corresponds to structure described and claimed in my copending application, Serial No. 452,925, filed July 30, 1942.

Figure 6:
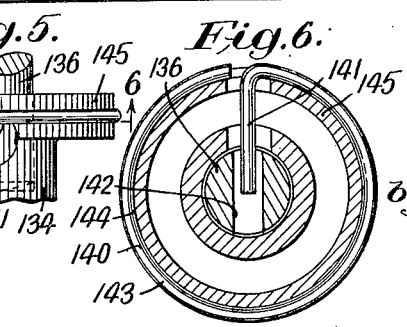
Fig. 6 is a transverse section on the plane of the line 6—6 of Fig. 5.
Figure 7:
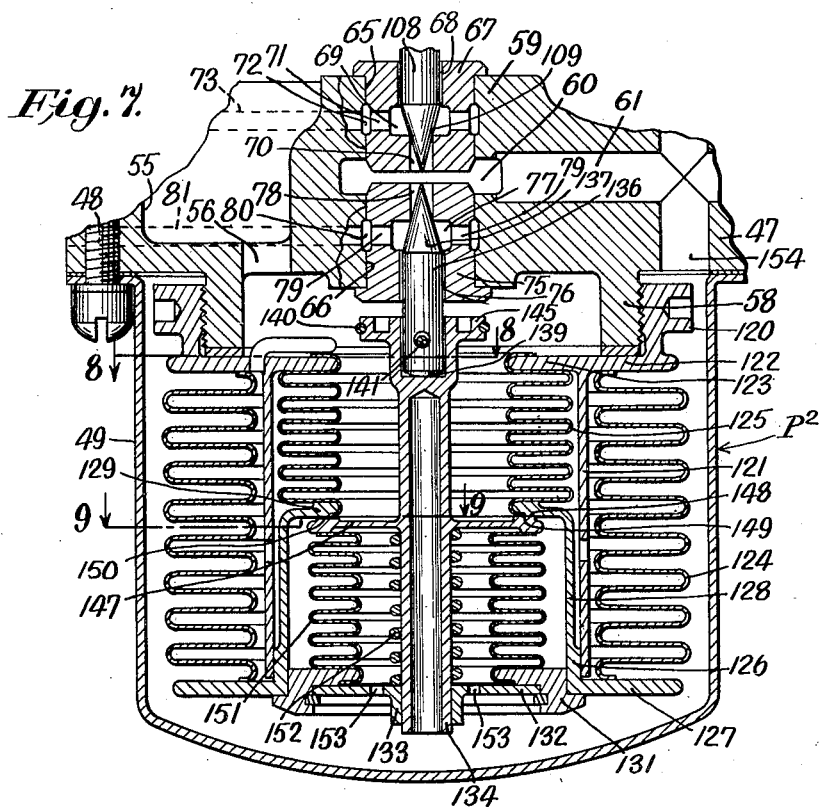
Fig. 7 is a fragmentary sectional view similar to a portion of Fig. 3 but on a larger scale showing one of the improved pilot valve mechanisms and the operating means therefor.
Figures 8, 9:
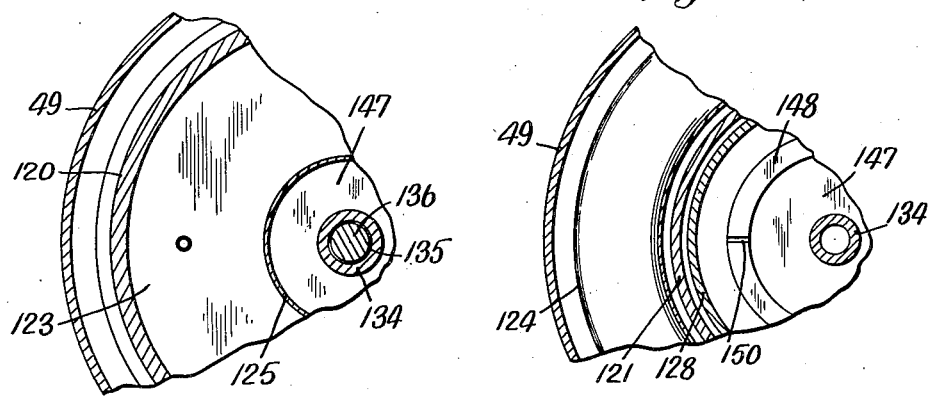
Fig. 8 is a fragmentary sectional view on the plane of the line 8—8 of Fig. 7.
Fig. 9 is a fragmentary sectional view on the plane of the line 9—9 of Fig. 7.

Threaded upon the flange 58 of the block 47 is a member 120, somewhat T-shaped in radial cross section, this member including a cylindrical stop portion 121, an outer flange portion 122 and an inner flange portion 123. Suitable bellows devices 124 and 125 are brazed, or otherwise held, at their upper ends to the flanges 122 and 123, and at their lower ends these devices are secured to an annular member 126. The space between these bellows is evacuated. The member 126 includes an end flange 127 to which the end of the bellows 124 is secured, a cylindrical portion 128 and a second radially extending portion 129, this one inwardly directed and having secured to it the bellows device 125. The radial flange 127 is adapted, in the relatively collapsed condition of the bellows, to engage the end of the stop portion 121. The lower end of the sleeve portion 128 carries an annular support member 131 within which there is mounted a circular plate 132 carrying a guide sleeve portion 133. Slidably mounted within the guide sleeve 133 is a stem 134 having at its upper end a socket 135 in which there is mounted a pilot valve element 136. This element has a forward tapering seating portion 137 which is adapted to close the opening 78 in the raised position of the plunger or stem 134. The lower end of the valve element 136 is received with a small degree of play in the socket 135 in the upper end of the stem and is slightly rounded, as shown at 139, so that it may tilt slightly, and it is normally held in position with the rounded surface against the bottom of the socket 135 by a spring 140 which has a radially extending portion 141 entering a transverse bore 142 in the valve element 136 and which has, as shown in Fig. 6, a peripheral portion 143 received in an annular groove 144 formed on a collarlike portion 145 carried by the upper end of the stem 134. The radially extending portion 141 is bent out of the plane of the peripheral portion 143 to exert a retracting pressure on the valve 136 to hold it in its socket. The stem 134 has between its ends, and in the construction shown approximately midway between its ends, a radial flange 147. This flange has a seating surface 148 which is adapted to engage a surface 149 on the lower side of the flange portion 129 of the member 126. A radial groove 150 in the peripheral portion of the flange 147 maintains communication between the space between the bellows 125 and the upper end of the stem 134 and the space enclosed by the sleevelike portion 128 of the member 126 even when the surfaces 148, 149 are in contact. Between the member 131 and the flange 147 there extends a suitable bellows device 151, suitably connected in sealed relation to the flange and to the member, and a spring 152, of appropriate strength, acts upon the flange and upon the plate 132 and tends to move the stem 134 in a direction to cause the tapered end 137 of the valve 136 to seal the passage 78.

It will be observed that the plate 132 is traversed by one or more openings 153 so that the interior of the bellows device 151 is in constant communication with external pressure through the interior of the casing 49 and a passage 154 opening into the passage 61 in the block 47.

It has been noted that the bellows 102 is an evacuated bellows, and its exterior is continuously subjected to the pressure conditions prevailing within the cabin of the airplane through the annular opening 98, screen 96 and the openings 97 communicating with the space provided by the coring-out of the block 47, at 55. The bellows 102 normally assumes a relatively collapsed position, with the head 103 against the stop 101, and with the valve 108 off its seat, adjustment of the spring 106 determines when the valve 108 will be seated. Normally, the spring 106 is so adjusted that when cabin pressure drops to a value corresponding to the external pressure at some height such as, say, 8,000 feet or 10,000 feet, the spring will be able to overcome the force exerted by the cabin pressure on the evacuated bellows, it being understood that the valve 108 is unseated at ground level and at elevations up to whatever level may be selected, say 10,000 feet. It will accordingly be appreciated that the interior of the bellows device 4 is connected to the exterior of the cabin continuously until the height of approximately 10,000 feet is reached. The bellows device 4 is so constructed that the valve 3 rests lightly upon the valve seat element 12 when the pressures upon the opposite sides of the device are equal, and accordingly a small pressure between the outside and the inside of the bellows, with the outside pressure the higher, will be sufficient to move the valve to its open position. Since, at elevations below 10,000 feet, the interior and exterior of the bellows device are connected respectively to the exterior and interior of the cabin, the valve 3 will be held in an open position only when the cabin pressure exceeds the outside pressure, that is only when the pressure on the outside of the bellows exceeds the pressure inside it, by an amount sufficient to open the valve. The pressure differential necessary for opening the valve will be quickly established by the supply of air to the cabin by the pressurizing apparatus. And the required differential can be destroyed by shutting off the connection of the inside of the bellows with the outside of the cabin and establishing a communication between the inside of the bellows and the interior of the cabin. Accordingly, the vent valve 3 will remain open until the altitude is reached at which the valve 108 will be closed. When that altitude is attained, the spring 106 moves the head 103 to close the valve 108, with the result that the communication of the interior of the bellows device 4 with the exterior of the plane will be interrupted, and cabin pressure then passing through the restricted annular opening along the outside of the valve 108 into the chamber 69 and through the passages 71, 72 and 73 into the interior of the bellows device 4 will cause a closing movement of the vent valve 3. As the vent valve closes the cabin pressure will tend to increase, and the instant it reaches a pressure sufficient, when applied to the evacuated bellows 102, to overcome the force exerted by the spring 106, the valve 108 will reopen, resulting in a reduction in the pressure inside the bellows device 4 and a partial reopening of the vent valve 3. Accordingly, whether by successive openings and closings of the valve 108, or by mere variation in position of that valve, there will be attained such a control of the pressure within the bellows device 4 that the cabin pressure will be held in close proximity to the value which corresponds to the altitude of 10,000 feet so long as the plane remains above 10,000 feet and below an altitude at which pilot mechanism $P^2$ with its valve 136 comes into operation.

As previously noted, the space within the bellows device 151 is continuously connected with external pressure; and the space above the flange 147 and also that surrounding the bellows device 151 is subjected to cabin pressure at all times. The spring 152 is so proportioned that its pressure on the flange 147 is just equal to the difference between cabin pressure and external pressure applied to the effective area of the bellows device 151 at some height, say 30,000 feet, at which it may be desired to have the valve 136 commence to function and preclude the development of an excessive differential in pressure between the interior of the cabin and the outside thereof. The absolute pressure at 10,000 feet is about 20.58 inches of mercury and that at 30,000 feet about 8.87 inches of mercury. Accordingly, when a difference in pressure equal to approximately 11.71 inches of mercury develops between the space above the flange 147 (cabin pressure) and the space within the bellows device 151 (external pressure), the valve 136 will be ready to unseat, and upon any further increase in height of the plane this valve will unseat, and it will take over control of the cabin pressure. As the plane passes above 30,000 feet the valve 136 will open and connect the interior of the bellows device 4 with the exterior of the cabin. This will permit pressure to be vented from within the bellows device 4, and the vent valve 3 will open somewhat, thereby reducing cabin pressure. As soon as the cabin pressure is reduced to a value such that the differential in pressure between the interior of the cabin and the exterior thereof falls below approximately 11.71 inches of mercury, the valve 136 will move in a closing direction again, thereby permitting cabin pressure passing along the stem of the valve 136 into the chamber 77 and through the radial passages 79, the annular groove 80 and the passage 81 into the bellows device 4 to cause a closing movement of the vent valve 3. Thus the valve 136 will serve to maintain at heights above 30,000 feet a constant differential in pressure between the interior of the cabin and the exterior thereof until some other control is superimposed on the valve 136.

By the time the plane reaches a height of 40,000 feet the external pressure will have fallen to a value of approximately 5.54 inches of mercury while the cabin pressure will still be equal to approximately 5.54+11.71, or about 17.25 inches of mercury, this result being effected by the maintenance of a substantially constant pressure differential of approximately 11.71 inches of mercury between cabin pressure and external pressure. There will therefore be a compression ratio of something more than three to one necessary to raise outside air at 40,000 feet to cabin pressure. As this is close to the compression ratio limit of centrifugal type cabin superchargers, for desirable operation, it is necessary to change from a constant pressure differential to a form of control which will maintain a constant ratio between cabin pressure and external pressure as the plane goes still higher.

In view of the presence of the slot 150, the cabin pressure acts upon a constant area, regardless of whether surfaces 148, 149 are in contact with each other, in a direction to move the member 126, the member 131, etc., in a direction to open the valve 136. And external pressure within the housing or casing member 49 acts on a larger but constant area tending to move the member 126, the member 131, etc., in a direction to close the valve 136. The two areas mentioned respectively exposed to cabin pressure and to external pressure are so determined that their ratio to each other will be the same as the ratio of external pressure to cabin pressure at the chosen height of 40,000 feet. Accordingly, as soon as this height is exceeded the valve 136 will be unseated, and so long as the plane operates at heights above 40,000 feet the control of cabin pressure will be regulated by the valve 136 under the control of the evacuated bellows 124, 125. It will be noted that as the height of 40,000 feet is exceeded the control will be such that a constant ratio between cabin and external pressure will be maintained, and as the plane rises above 40,000 feet the actual differential between cabin and external pressure will become less than existed at the elevation of 40,000 feet, and accordingly the surface 148 will remain on the surface 149 continuously during this period of high altitude flight and the whole control will be by the composite bellows 124, 125. The relative areas exposed to cabin pressure and to external pressure and determined by the bellows devices 125 and 124 will be approximately in the ratio of 5.54 to 17.25.

Figure 3:
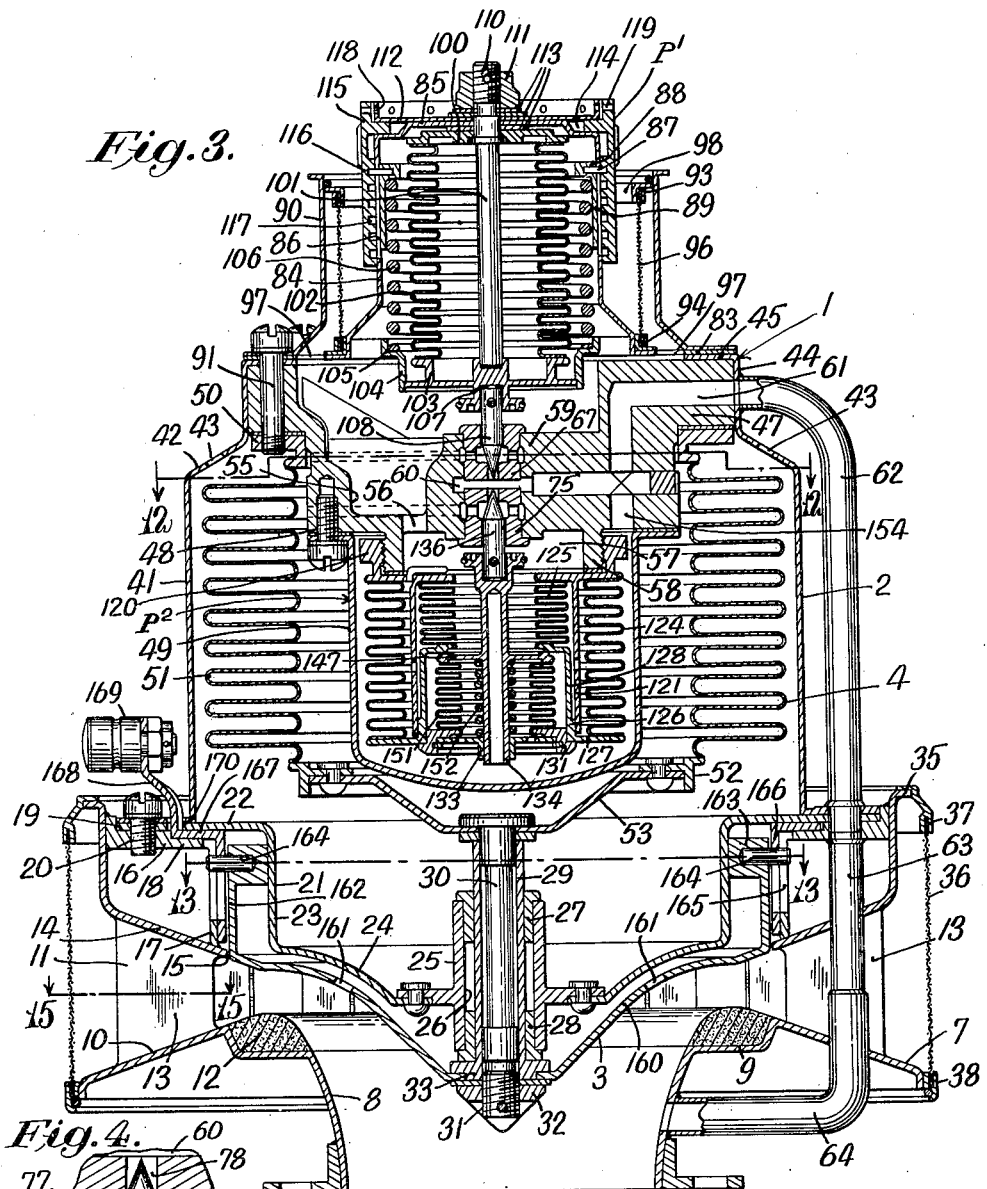
Fig. 3 is an enlarged central vertical section through the device of Figs. 1 and 2, taken on the line 3—3 of Fig. 2, and showing the same with a vent valve which forms a part thereof in full open position.
Figure 4:
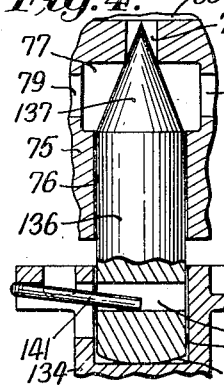
Fig. 4 is an enlarged fragmentary sectional view showing one of the pilot valve devices which constitute a portion of the control mechanism for the cabin vent valve.
Figure 5:
Fig. 5 is a fragmentary side elevational view of a portion of the valve device shown in Fig. 4.

The valve 3 includes a relatively conical portion 160 perforated as at 161 so that the pressures may be similar on opposite sides thereof, and has at its outer edge a cylindrical sleevelike portion 162 to which there is secured a ring 163 guided on the outer wall of the cylindrical portion 23. Projecting outwardly from the cylindrical portion 162 are pins 164 extending through vertical slots 165 in the annular cylindrical wall 17. Between the wall 162 and the wall 17 there is rotatably mounted a cylindrical member 166 having a radial flange 167 to which there is welded an upstanding operating flange portion 168 carrying a button or finger piece 169. The portion 168 moves in an arcuate slot 170 in the wall 22. The wall portion 166 is traversed, as shown in Figs. 3 and 14, by a series of openings each including a relatively right-triangular portion 171 and a communicating helically extending elongated portion 172. The top wall 173 of the portion 171 lies in a plane perpendicular to the axis of the mechanism. The top and bottom walls 174 and 175 of the helically extending portion 172 extend obliquely downward. The lower wall of the portion 171 is relatively sharply upwardly inclined, as at 176. The end wall of portion 171 is vertical, as at 177. Now it will be evident that by turning the annulus 166 clockwise, in terms of directions looking down upon the valve device in Fig. 3, and causing the helically disposed portions 172 to engage the pins 164, the valve 3 may be adjusted to and held in substantially any desired position. It will further be observed that when the annulus 166 is left in the position indicated in Fig. 3, the valve may move freely up and down without interference from this annulus. It will also be evident that when the valve is nearly closed or quite closed, if the same becomes stuck by ice or the like, the surface 176 may be caused to wedge up the valve and because of its steepness can be used to cause the valve to reciprocate rapidly and thus to free it from ice.

The mode of operation of the invention as a whole will be obvious from what has been said. The pressure within the cabin is adapted to follow outside pressure closely until some predetermined height, such as 8,000 to 10,000 feet, is reached. For the purpose of the illustrative figures which have been given, the height of 10,000 feet is assumed. When the height of 10,000 feet is reached the upper pilot mechanism $P^1$, including an evacuated bellows which is expanded when the predetermined height is attained, operates to close the pilot valve which has previously permitted a free connection between the interior of the bellows which operates the cabin vent valve with the outside air; and when this pilot valve 108 is closed air from the cabin enters the bellows which controls the cabin vent valve and effects a closing movement of the latter. This upper pilot mechanism $P^1$ operates to maintain approximately constant cabin pressure until some relatively considerable altitude, like 30,000 feet, is reached. It will be observed that this pilot mechanism is provided with adjusting means which will permit of substantial variation in the lower one of the critical heights mentioned. When a height of say 30,000 feet is reached another pilot mechanism $P^2$ takes over control. This pilot device has a compound control and the initial control is such as to maintain a constant difference in pounds per square inch or in inches of mercury between cabin pressure and external pressure, though the plane continues to rise. This pilot device controls the communication of the bellows which directly actuates the cabin vent valve with external pressure and also permits the bleeding of cabin pressure into the bellows. The control which is effective from say 30,000 feet to say 40,000 feet includes a bellows device subjected on its outside to cabin pressure and internally to external pressure, that is, the pressure outside the cabin. A spring operates to provide the desired differential in pressure. When a height of say 40,000 feet is attained, a ratio between cabin pressure and external pressure is reached which is as great as it is desired to go and then the other control of the second pilot valve mechanism takes over and operates, at all heights above 40,000 feet or whatever other altitude may be selected, so to govern the pilot valve 136 as to maintain a constant ratio between cabin pressure and external pressure. Since the actual differential between cabin pressure and external pressure diminishes, even though the ratio is maintained constant, as the plane rises above 40,000 feet, the first mentioned control of this second pilot valve 136 becomes inoperative and the control is wholly under the evacuated differential type bellows mechanism 124, 125. Means is provided, as noted above, for effecting a manual adjustment of the cabin vent valve and for effecting a clearing of the latter from ice when necessary. The pressures in inches of mercury quoted above are for conditions when there is a barometric reading at sea level of 29.92 inches of mercury.

It will be clear from the foregoing description that I have provided a simple, compact and effective arrangement for providing the desired controls of cabin pressure, and that this means includes in a preferred arrangement: first, means permitting the cabin pressure to follow external pressure closely; second, means for maintaining cabin pressure substantially constant over a fairly wide range of flying elevations; third, means for thereafter providing for the maintenance of a constant differential in pressure between the interior of the cabin and the outside of the plane, this means being effective during a substantial further range of elevations; and fourth, means effective at all higher elevations than the predetermined upper limit selected for the third range for maintaining a constant ratio between cabin and external pressures.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a valve mechanism, a valve seat, a valve movable relative to said seat, an expansible chamber device for actuating said valve, and a pilot device for controlling the flow of fluid relative to said expansible chamber device including valve means and operating devices for said valve means each operative to move the same both in an opening and in a closing direction and both received within said expansible chamber device and one surrounding the other.

2. In a valve mechanism, a valve seat, a valve movable relative to said seat, an expansible chamber device for actuating said valve, and a pilot device for controlling the flow of fluid relative to said expansible chamber device including a pilot valve member, and operating devices for said pilot valve member each operative to move the same both in an opening and in a closing direction and both received within said expansible chamber device and one surrounding the other.

3. In combination, in a cabin pressure controlling apparatus, a valve, a stem for moving said valve, a bellows device subjected externally and internally respectively to cabin pressure and to exterior pressure and connected at one end to said stem and at its other end to a support member, and a bellows device for controlling the position of said support member and subjected internally and externally respectively to cabin pressure and to exterior pressure.

4. In combination, in a cabin pressure controlling apparatus, a valve, a stem for moving said valve, a bellows device subjected externally and internally respectively to cabin pressure and to exterior pressure and connected at one end to said stem and at its other end to a support member, and an evacuated bellows device for controlling the position of said support member and subjected externally to exterior pressure.

5. In combination, in a cabin pressure controlling apparatus, a valve, a stem for moving said valve, a bellows device subjected externally and internally respectively to cabin pressure and to exterior pressure and connected at one end to said stem and at its other end to a support member, and an evacuated bellows device for controlling the position of said support member and subjected upon its external surface to exterior pressure, said evacuated bellows device having thereon means for limiting the expansion of said first mentioned bellows device.

6. In a cabin pressure controlling apparatus, a valve device movable to effect variation in cabin pressure and controlling means for said valve device including means for controlling the same to maintain cabin pressure substantially constant throughout a substantial range of altitudes, and means for controlling said valve device during flight at altitudes above the upper limit of said range and operative first to control said valve device to maintain a constant differential in pressure between cabin and exterior pressure and, at still greater elevations, to maintain a constant ratio between cabin and exterior pressure, said means for controlling said valve device during flight at altitudes above the upper limit of said range including an evacuated bellows providing constant ratio control and supporting a differential control bellows.

7. In a cabin pressure controlling apparatus, a valve device movable to effect variation in cabin pressure and controlling means for said valve device including means for controlling the same to maintain cabin pressure substantially constant throughout a substantial range of altitudes, and means including a valve element having a plurality of controls for controlling said valve device during flight at altitudes above the upper limit of said range for first controlling said valve device to maintain a constant differential in pressure between cabin and exterior pressures and, at still greater elevations, to maintain a constant ratio between cabin and exterior pressures, said plurality of controls including a centrally arranged differential pressure responsive expansible chamber device and a surrounding constant ratio expansible chamber device.

8. In a valve mechanism, a valve seat, a valve movable relative to said seat, means including a bellows for actuating said valve, and means for controlling the flow of fluid relative to said bellows, said last mentioned means including valve members and coaxial expansible chamber devices for said valve members, a plurality of said expansible chamber devices being received within said bellows.

9. In a valve mechanism, a valve seat, a valve movable relative to said seat, means including a bellows for actuating said valve, and means for controlling the flow of fluid relative to said bellows, said last mentioned means including coaxial pilot valve members and coaxial bellows for said valve members, more than one of said last mentioned bellows received within said first mentioned bellows.

10. In a cabin pressure control mechanism, a cabin vent valve, an expansible chamber actuating device for said vent valve, and controlling means for said expansible chamber actuating device including a plurality of pilot valves each having a valve-chamber-providing means with which it cooperates, each of said valve-chamber-providing means including a valve seat having a passage opening through the same and connected with the outer air, a chamber into which said passage opens through said seat and which has a connection with said expansible chamber actuating device, and means forming a conduit having a connection with the interior of the cabin, and actuating means for said pilot valves including expansible chamber devices each having a movable wall, one of said movable walls subjected on one side to cabin pressure and on its other side to a substantial vacuum and the other of said movable walls subjected on one side to external pressure and on its other side in part to a substantial vacuum and in part to cabin pressure.

11. In a cabin pressure control mechanism, a cabin vent valve, an expansible chamber actuating device for said vent valve, and controlling means for said expansible chamber actuating device including a plurality of pilot valves each having a valve-chamber-providing means with which it cooperates, each of said valve-chamber-providing means including a valve seat having a passage opening through the same and connected with the outer air, a chamber into which said passage opens through said seat and which has a connection with said expansible chamber actuating device, and means forming a conduit having a connection with the interior of the cabin, and actuating means for said pilot valves including expansible chamber devices each having a movable wall, one of said movable walls subjected on one side to cabin pressure and on its other side to a substantial vacuum and the other of said movable walls subjected on one side to external pressure and on its other side at least in part to a substantial vacuum.

12. In a cabin pressure controlling apparatus, a valve member movable to effect variation in cabin pressure and controlling means for said valve member including a bellows device, means including a valve device for subjecting one side of said bellows device to different pressures, and pressure responsive control mechanisms for said valve device, one responsive throughout a predetermined range of pressure differentials between the cabin pressure and the exterior pressure for regulating the pressures on said bellows device to adjust said valve member and effect a predetermined pressure differential between the cabin pressure and the exterior pressure, and another control mechanism responsive also to pressure differentials between the cabin pressure and the exterior pressure for regulating the pressures on said bellows device to adjust said valve member and effect a fixed ratio between the cabin pressure and the exterior pressure, said last mentioned pressure responsive control mechanism including an evacuated bellows having a fixed end and a relatively movable end and said first mentioned pressure responsive control mechanism including a bellows having an end secured to the last mentioned end of said evacuated bellows.

13. In a cabin pressure controlling apparatus, a valve member movable to effect variation in cabin pressure and controlling means for said valve member including a bellows device, means including a valve device for subjecting one side of said bellows device to different pressures, and pressure responsive control mechanisms for said valve device, said control mechanisms including a bellows device subjected upon its opposite sides to cabin pressure and to exterior pressure and having its opposite ends connected respectively to said valve device and to a support member, and a bellows device for controlling the position of said support member and subjected upon its opposite sides to cabin pressure and to exterior pressure.

14. In a cabin pressure controlling apparatus, a valve member movable to effect variation in cabin pressure and controlling means for said valve member including a bellows device, means including a valve device for subjecting one side of said bellows device to different pressures, and pressure responsive control mechanisms for said valve device, said control mechanisms including a bellows device subjected upon its opposite sides to cabin pressure and to exterior pressure and having its opposite ends connected respectively to said valve device and to a support member, and an evacuated bellows device for controlling the position of said support member and subjected upon its opposite sides to cabin pressure and to exterior pressure.

15. In a cabin pressure controlling apparatus, a valve member movable to effect variation in cabin pressure and controlling means for said valve member including a bellows device, means including a valve device for subjecting one side of said bellows device to different pressures, and pressure responsive control mechanisms for said valve device, said control mechanisms including a bellows device subjected upon its opposite sides to cabin pressure and to exterior pressure and having its opposite ends connected respectively to said valve device and to a support member, and an evacuated bellows device having its opposite ends connected respectively to a stationary mounting and to said support member for controlling the position of the latter, said evacuated bellows subjected upon oppositely facing unequal areas to cabin pressure and to exterior pressure.

16. In a cabin pressure controlling apparatus, a valve member movable to effect variation in cabin pressure and controlling means for said valve member including a bellows device, means including a valve device for subjecting one side of said bellows device to different pressures, and pressure responsive control mechanisms for said valve device, said control mechanisms including a bellows device subjected upon its opposite sides to cabin pressure and to exterior pressure and having its opposite ends connected respectively to said valve device and to a support member, and an evacuated bellows device having its opposite ends connected respectively at spaced points to a stationary mounting and to said support member for controlling the position of the latter, said support member subjected upon oppositely facing unequal areas to cabin pressure and to exterior pressure.

17. In a valve mechanism, a valve seat, a valve movable relative to said seat, an expansible chamber device for actuating said valve, and a pilot device for controlling the flow of fluid relative to said expansible chamber device including a valve member and a plurality of fluid actuated operating devices for said valve member, said operating devices effective throughout different predetermined pressure ranges for controlling said valve member.

18. In a cabin pressure controlling apparatus, a valve device movable to effect variation in cabin pressure, an expansible chamber device for actuating said valve device, and a pilot device for controlling the flow of fluid relative to said expansible chamber including a valve member and controlling means for said valve member, said controlling means subjected to cabin and ambient pressures and operative to effect an actuation of said valve device for maintaining a constant differential between cabin and exterior pressure throughout a predetermined range of flight and for maintaining a constant ratio between cabin and exterior pressure throughout a different range of flight, said controlling means including a differential pressure expansible chamber control device subjected to cabin and ambient pressures and an overriding ratio control expansible chamber device also subjected to cabin and ambient pressures for controlling the position bodily of said differential pressure expansible chamber control device.

19. In a cabin pressure controlling apparatus, a valve device movable to effect variation in cabin pressure, an expansible chamber device for actuating said valve device, and a pilot device for controlling the flow of fluid relative to said expansible chamber device including a valve member and controlling means for said valve member, said controlling means including expansible chamber devices subjected to cabin and exterior pressure and operative to effect an actuation of said valve device for maintaining a constant differential between cabin and exterior pressure throughout a predetermined range of flight and for maintaining a constant ratio between cabin and exterior pressure throughout a higher range of flight, said controlling means including a differential pressure expansible chamber control device and an evacuated bellows supporting and enclosing said differential pressure expansible chamber control device.

20. In a cabin pressure controlling apparatus, a valve device movable to effect a variation in cabin pressure, an expansible chamber device for actuating said valve device, and means for controlling the flow of fluid relative to said expansible chamber device including a plurality of pilot valve members and controlling means therefor, the controlling means for one of said valve members operative to effect an actuation of said valve device to maintain cabin pressure substantially constant throughout a predetermined range of flight, and the controlling means for another of said valve members operative to effect an actuation of said valve device for maintaining a constant differential between cabin and exterior pressure throughout a higher range of flight and for maintaining a constant ratio between cabin and exterior pressure throughout a still higher range of flight, said controlling means for said pilot valve members including three bellows devices with their axes in a common straight line.

21. In a valve mechanism, a valve seat, a valve movable relative to said seat, an expansible chamber device for actuating said valve, and a pilot device for controlling the flow of fluid relative to said expansible chamber device including valve means and plural pressure fluid responsive operating devices for said valve means, said plural pressure fluid responsive operating devices each received within said expansible chamber device.

22. In a valve mechanism, a valve seat, a valve movable relative to said seat, an expansible chamber device for actuating said valve, and a pilot device for controlling the flow of fluid relative to said expansible chamber device including a pilot valve member and plural pressure fluid responsive operating devices for said pilot valve member, said plural pressure fluid responsive operating devices each received within said expansible chamber device.

23. In a valve mechanism, a valve seat, a valve movable relative to said seat, an expansible chamber device for actuating said valve, and a pilot device for controlling the flow of fluid relative to said expansible chamber device including valve means and coaxial, pressure fluid responsive operating devices for said valve means, said coaxial pressure fluid responsive operating devices each received within said expansible chamber device.

24. In a valve mechanism, a valve seat, a valve movable relative to said seat, an expansible chamber device for actuating said valve, and a pilot device for controlling the flow of fluid relative to said expansible chamber device including a pilot valve member and coaxial, pressure fluid responsive operating devices for said pilot valve member, said coaxial pressure fluid responsive operating devices each received within said expansible chamber device.

25. In a valve mechanism, a valve seat, a valve movable relative to said seat, an expansible chamber device for actuating said valve, and a pilot device for controlling the flow of fluid relative to said expansible chamber device including valve means and two expansible chamber operating devices for said valve means, said expansible chamber operating devices both received within said expansible chamber device and one surrounding the other.

26. In a valve mechanism, a valve seat, a valve movable relative to said seat, an expansible chamber device for actuating said valve, and a pilot device for controlling the flow of fluid relative to said expansible chamber device including a pilot valve member, and two expansible chamber operating devices for said pilot valve member, said expansible chamber operating devices both received within said expansible chamber device and one surrounding the other.

27. In a valve mechanism, a valve seat, a valve movable relative to said seat, an expansible chamber device for actuating said valve, and pilot valve devices for controlling the flow of fluid relative to said expansible chamber device including valve means and coaxial operating devices for said valve means, a plurality of said operating devices being wholly received within said expansible chamber device.

28. In a valve mechanism, a valve seat, a valve movable relative to said seat, an expansible chamber device for actuating said valve, and pilot valve mechanism for controlling the flow of fluid relative to said expansible chamber device including coaxial pilot valve devices and coaxial operating devices for said pilot valve devices, one outside of and more than one received within said expansible chamber device.

29. In a valve mechanism, a valve seat, a valve movable relative to said seat, an expansible chamber device for actuating said valve, and pilot valve mechanism for controlling the flow of fluid relative to said expansible chamber device including coaxial pilot valve devices and coaxial operating devices for said pilot valve devices each operative to move the pilot valve device which it operates in an opening and in a closing direction, more than one received within said expansible chamber device.

30. In a valve mechanism, a valve seat, a valve movable relative to said seat, an expansible chamber device for actuating said valve, and a pilot valve mechanism for controlling the flow of fluid relative to said expansible chamber device and received within said expansible chamber device, said pilot valve mechanism including a pilot valve and a plurality of pressure fluid responsive control means therefor.

31. In a valve mechanism, a valve seat, a valve movable relative to said seat, an expansible chamber device for actuating said valve including a bellows having one end thereof operatively connected to said valve and the other end thereof fixed, a mounting for the latter end of said bellows, a recessed closure member in fixed relation to said mounting and coacting with said bellows in the formation of an expansible chamber, and means for controlling the pressure within said expansible chamber including a valve seat supported by said mounting, a valve coacting with said seat, and a plurality of pressure fluid actuated operating means for said valve enclosed within said recessed closure member.

32. In a valve mechanism, a valve seat, a valve movable relative to said seat, an expansible chamber device for actuating said valve including a bellows having one end thereof operatively connected to said valve and the other end thereof fixed, a mounting for the latter end of said bellows, a recessed closure member supported on said mounting and extending into and coacting with said bellows in the formation of an expansible chamber, and means for controlling the pressure within said expansible chamber including a pilot valve and controlling means for said pilot valve within the recess of said closure member including coaxial bellows devices for successively controlling said pilot valve.

33. In a valve mechanism, a valve seat, a valve movable relative to said seat, an expansible chamber device for actuating said valve including a bellows having one end thereof operatively connected to said valve and the other end thereof fixed, a mounting for the latter end of said bellows, a recessed closure member supported on said mounting and coacting with said bellows in the formation of an expansible chamber, and means for controlling the pressure within said expansible chamber including a pilot valve and controlling means for said pilot valve including a bellows housed within the recess of said closure member and having its interior subject to the pressure inside said recessed closure member.

34. In a valve mechanism, a valve seat, a valve movable relative to said seat, an expansible chamber device for actuating said valve, and pilot valve devices for controlling the flow of fluid relative to said expansible chamber device including valve means and operating devices for said valve means having their axes in a common straight line, two of said operating devices wholly received within said expansible chamber device.

35. In a valve mechanism, a valve seat, a valve movable relative to said seat, an expansible chamber device for actuating said valve, and pilot valve mechanism for controlling the flow of fluid relative to said expansible chamber device including alined pilot valve devices and operating devices for said pilot valve devices having their axes in a common straight line, one of said pilot valve devices having a pair of operating devices received within said expansible chamber device.

36. In a control valve mechanism, a control valve, a fluid actuated, expansible chamber device for actuating said valve, and a pilot valve mechanism for controlling the flow of fluid relative to said expansible chamber device, said pilot valve mechanism including a valve device and a pair of expansible chamber operating means therefor, said valve device and said pair of expansible chamber operating means therefor received within said expansible chamber device.

37. In a unitary valve mechanism, in combination, a casing, valve means in said casing for controlling the flow of a fluid, pressure responsive means in said casing for controlling the position of said valve means, means in said casing for controlling the flow of pressure fluid relative to said pressure responsive means, and pressure responsive means in said casing for controlling said fluid flow controlling means, including an expansible evacuated member having a movable wall subjected on one side to the pressures at one side of said valve means and a further expansible member for controlling said fluid flow controlling means, said first mentioned pressure responsive means, said flow controlling means, and said second pressure responsive means all coaxially arranged and said first mentioned pressure responsive means, said expansible evacuated member and said further expansible member all so disposed relative to each other as to be cut by a common plane perpendicular to the axis of their coaxial arrangement.

38. In a unitary mechanism for controlling the air pressure in the cabin of an airplane, in combination, a casing, a vent valve in said casing for controlling the flow of pressure fluid relative to the cabin, pressure fluid responsive mechanism in said casing for controlling the position of said vent valve, and pilot valve mechanism in said casing including control devices responsive to pressure conditions inside and outside of the cabin, for respectively controlling the flow of fluid with respect to said pressure responsive mechanism to maintain a constant differential between cabin and ambient pressures during flight at predetermined altitudes and a constant ratio between cabin and ambient pressures during flight at higher altitudes, said vent valve, said pressure fluid responsive mechanism, and said pressure conditions responsive control devices all coaxially arranged and said pressure responsive means and said pressure conditions responsive control devices so relatively arranged that they are cut by a common plane perpendicular to the axis of said coaxial arrangement.

39. In combination, in a cabin pressure controlling apparatus, a valve, a stem for moving said valve, a bellows device subjected externally and internally respectively to cabin pressure and to exterior pressure and connected at one end to said stem and at its other end to a support member, and an evacuated bellows device for controlling the position of said support member and subjected upon its external surface to exterior pressure, said evacuated bellows device having thereon means for limiting the expansion of said first mentioned bellows device and being provided with means for limiting its own collapse.

40. In a cabin pressure controlling apparatus, a valve device movable to effect a variation in cabin pressure, an expansible chamber device for actuating said valve device, and means for controlling the flow of fluid relative to said expansible chamber device including a plurality of pilot valve members and controlling means therefor, the controlling means for one of said pilot valve members operative to effect an actuation of said valve device to maintain cabin pressure substantially constant throughout a predetermined range of flight, and the controlling means for another of said pilot valve members operative to effect an actuation of said valve device for maintaining a constant differential between cabin and exterior pressure throughout a higher range of flight and for maintaining a constant ratio between cabin and exterior pressure throughout a still higher range of flight, said controlling means for said pilot valve members including three bellows devices with their axes in a common straight line, the controlling means for said other of said pilot valve members including bellows devices each having relatively movable end walls and arranged with the end walls of one of the same within the space between the end walls of the other.

41. In combination, in a cabin pressure controlling apparatus, a valve, a stem for moving said valve, a bellows device subjected externally and internally respectively to cabin pressure and to exterior pressure and connected at one end to said stem, a support member to which the other end of said bellows device is connected, means for exerting a yielding pressure between said support member and the end of said bellows device which is connected to said stem, a second bellows device having its end nearer said valve fixed and its other end connected to and supporting said support member, and means for subjecting said support member upon its surface opposite said bellows devices to exterior pressure.

42. In combination, in a cabin pressure controlling apparatus, a valve, a stem for moving said valve, a bellows device subjected externally and internally respectively to cabin pressure and to exterior pressure and connected at one end to said stem, a support member to which the other end of said bellows device is connected, means for exerting a yielding pressure between said support member and the end of said bellows device which is connected to said stem, an evacuated bellows device having its end nearer said valve fixed and its other end connected to and supporting said support member, and means for subjecting said support member upon its surface opposite said bellows devices to exterior pressure, said evacuated bellows device having a chamber centrally thereof in which said first bellows device is housed.

43. In combination, in a cabin pressure controlling apparatus, a valve, a stem for moving said valve, a bellows device subjected externally and internally respectively to cabin pressure and to exterior pressure and connected at one end to said stem, a support member to which the other end of said bellows device is connected, means for exerting a yielding pressure between said support member and the end of said bellows device which is connected to said stem, an evacuated bellows device having its end nearer said valve fixed and its other end connected to and supporting said support member, and means for subjecting said support member upon its surface opposite said bellows devices to exterior pressure, said second bellows device including collapsible portions of unequal length and a rigid tubular portion connected at its opposite ends to the mutually adjacent ends of said collapsible portions and said first bellows device being received in said rigid tubular portion.

44. In combination, in a cabin pressure controlling apparatus, a valve, a stem for moving said valve, a bellows device subjected externally and internally respectively to cabin pressure and to exterior pressure and connected at one end to said stem, a support member to which the other end of said bellows device is connected, means for exerting a yielding pressure between said support member and the end of said bellows device which is connected to said stem, an evacuated bellows device having its end nearer said valve fixed and its other end connected to and supporting said support member, and means for subjecting said support member upon its surface opposite said bellows devices to exterior pressure, said second bellows device including collapsible portions of unequal length and a rigid tubular portion connected at its opposite ends to the mutually adjacent ends of said collapsible portions and said first bellows device being received in said rigid tubular portion and said rigid tubular portion supporting a stop for limiting the expansion of said first mentioned bellows device.

WIN W. PAGET.

REFERENCES CITED

The following references are of record in the file of this patent:

UNITED STATES PATENTS

| Number | Name | Date |
|---|---|---|
| 530,773 | Herdman | Dec. 11, 1894 |
| 1,508,398 | Kelly | Sept. 16, 1924 |
| 2,208,554 | Price | July 16, 1940 |
| 2,289,639 | Fausek et al. | July 14, 1942 |
| 2,291,101 | Papulski | July 28, 1942 |
| 2,294,693 | Ray | Sept. 1, 1942 |
| 2,307,199 | Cooper | Jan. 5, 1943 |
| 2,316,416 | Gregg | Apr. 13, 1943 |
| 2,396,116 | Noxon | Mar. 5, 1946 |
| 2,425,000 | Paget | Aug. 5, 1947 |
| 2,435,819 | Crever et al. | Feb. 10, 1948 |
| 2,461,415 | Dube | Feb. 8, 1949 |

FOREIGN PATENTS

| Number | Country | Date |
|---|---|---|
| 521,623 | Great Britain | May 27, 1940 |
| 679,386 | France | Jan. 9, 1930 |
| 748,591 | France | Apr. 18, 1933 |

Disclaimer 2,484,848.—*Win W. Paget*, Michigan City, Ind. PRESSURE CONTROLLING APPARATUS. Patent dated Oct. 18, 1949. Disclaimer filed Mar. 21, 1951, by the assignee, *Joy Manufacturing Company*.

Hereby enters this disclaimer to claim 17 of said patent.

[*Official Gazette April 24, 1951.*]